PULSE GENERATOR

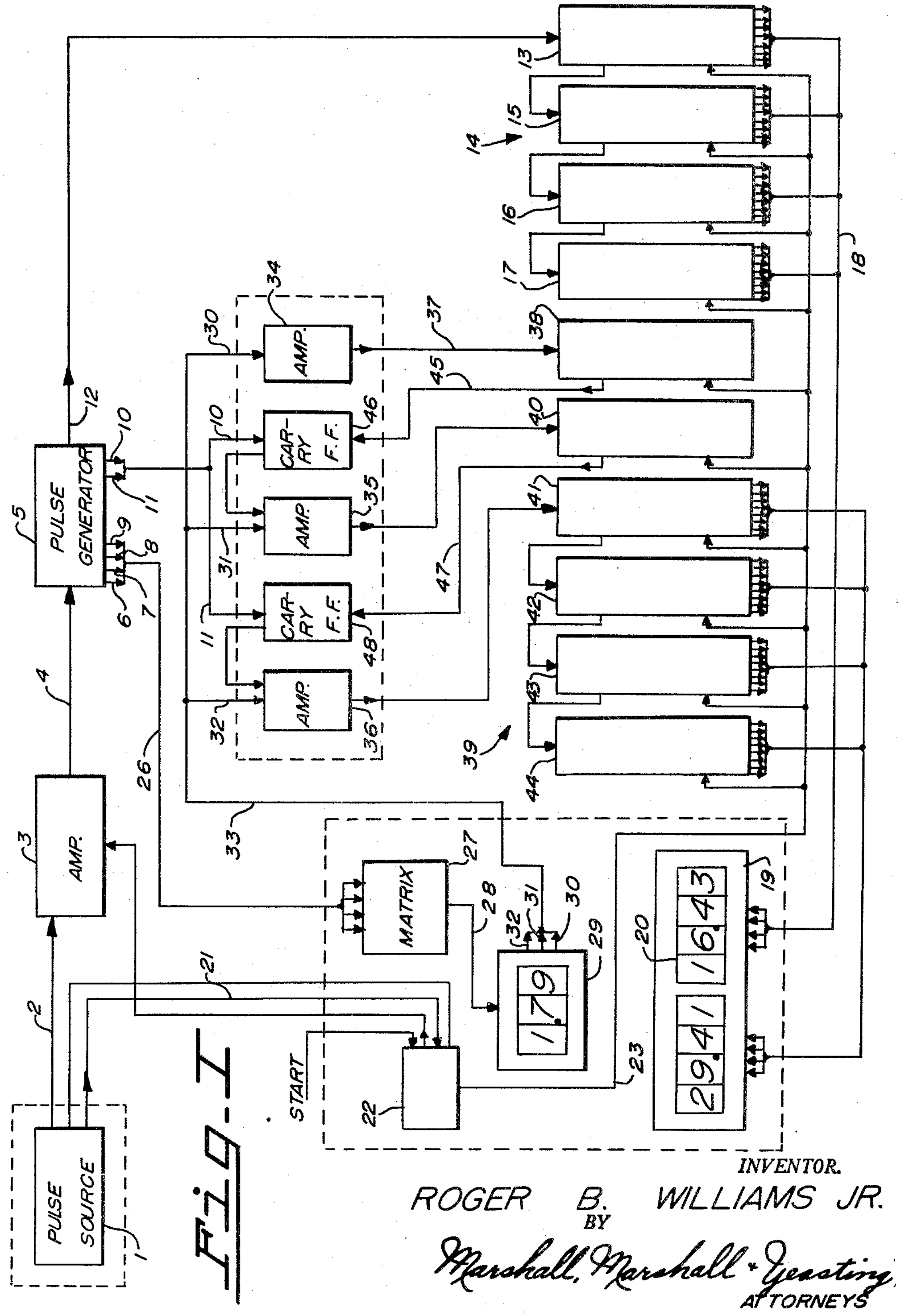
Fig. I
INVENTOR.
ROGER B. WILLIAMS JR.
BY
Marshall, Marshall & Yeasting
ATTORNEYS Jan. 31, 1961 R. B. WILLIAMS, JR 2,970,269
PULSE GENERATOR
Filed May 18, 1956 5 Sheets-Sheet 2
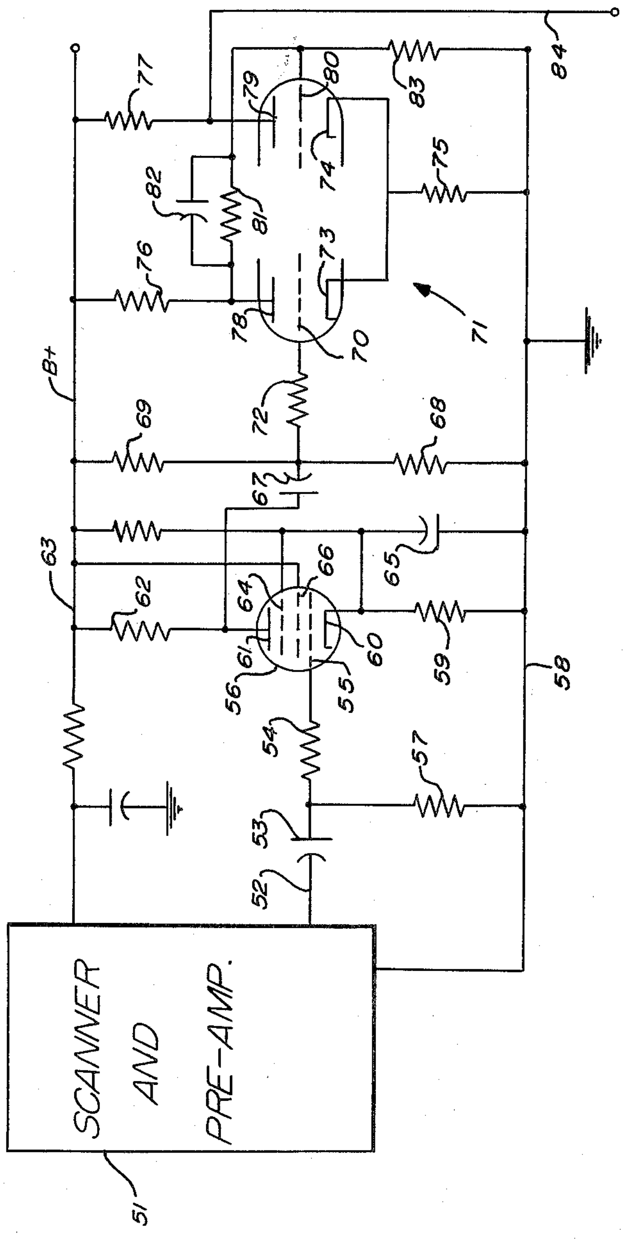
Fig. II
INVENTOR.
ROGER B. WILLIAMS JR.
BY
Marshall, Marshall & Yeasting
ATTORNEYS Jan. 31, 1961 R. B. WILLIAMS, JR 2,970,269
PULSE GENERATOR
Filed May 18, 1956 5 Sheets-Sheet 3
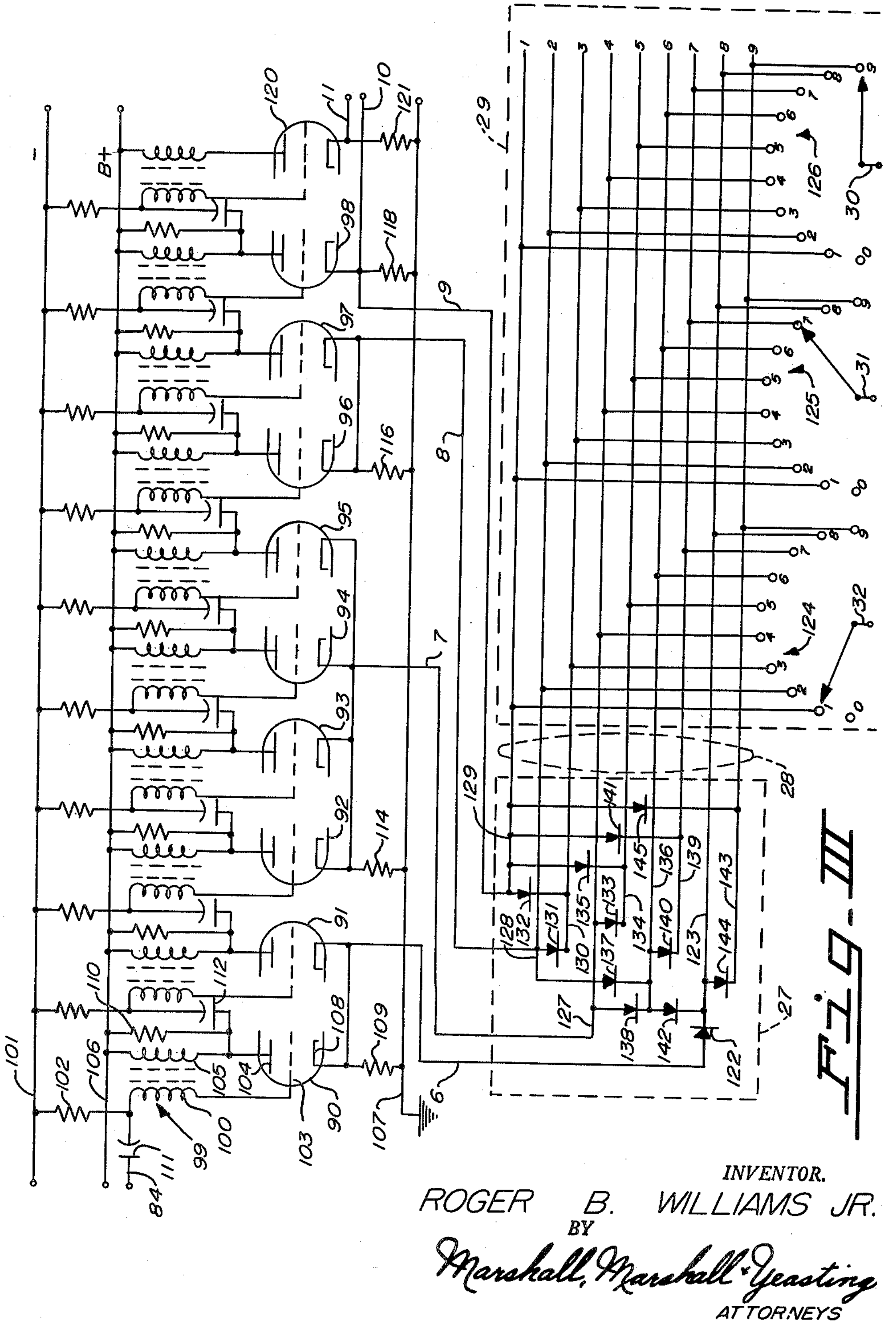
FIG. III
INVENTOR.
ROGER B. WILLIAMS JR.
BY
Marshall, Marshall & Yeasting
ATTORNEYS

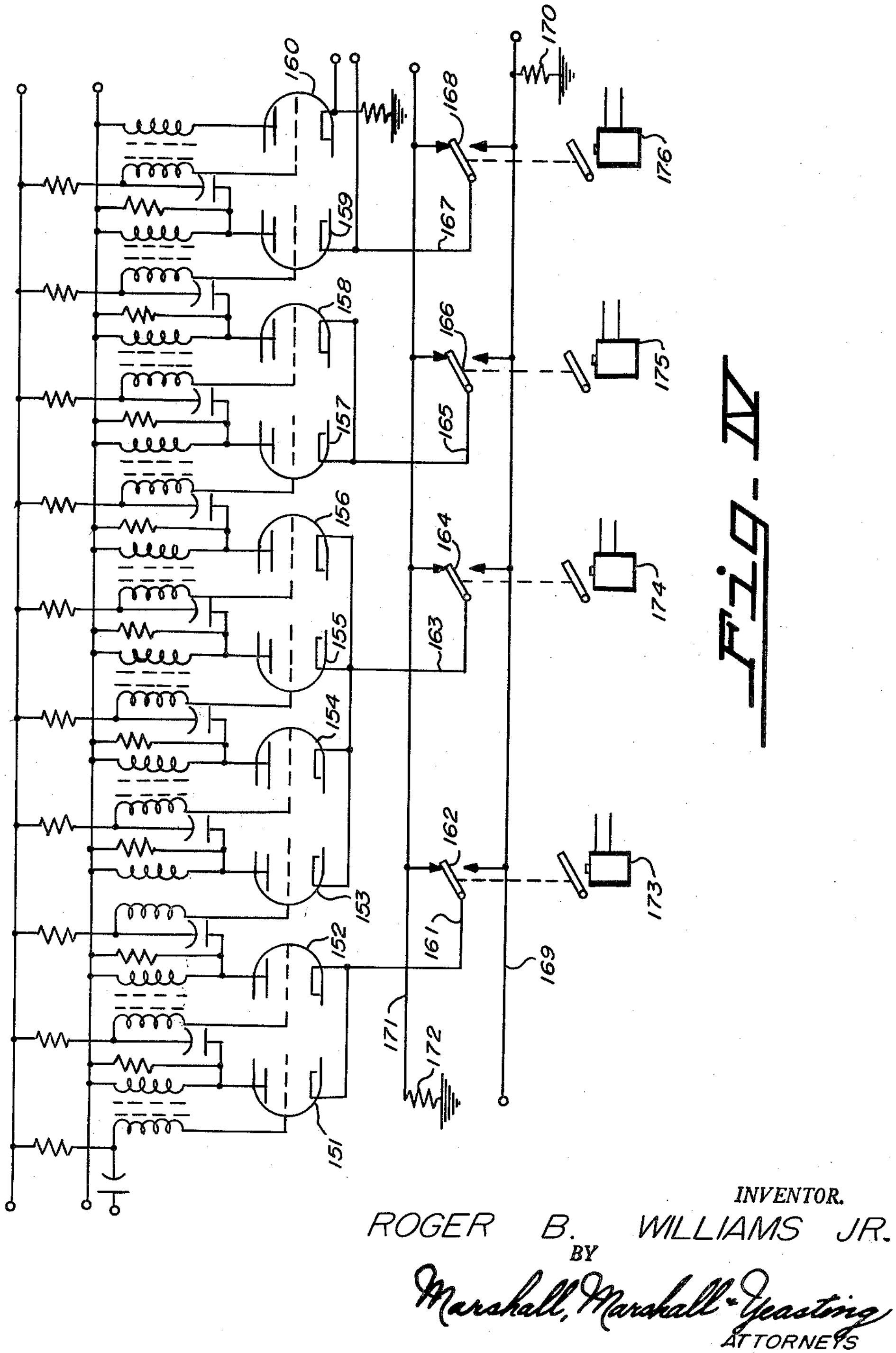
FIG. IV
INVENTOR.
ROGER B. WILLIAMS JR.
BY
Marshall, Marshall & Yeasting
ATTORNEYS

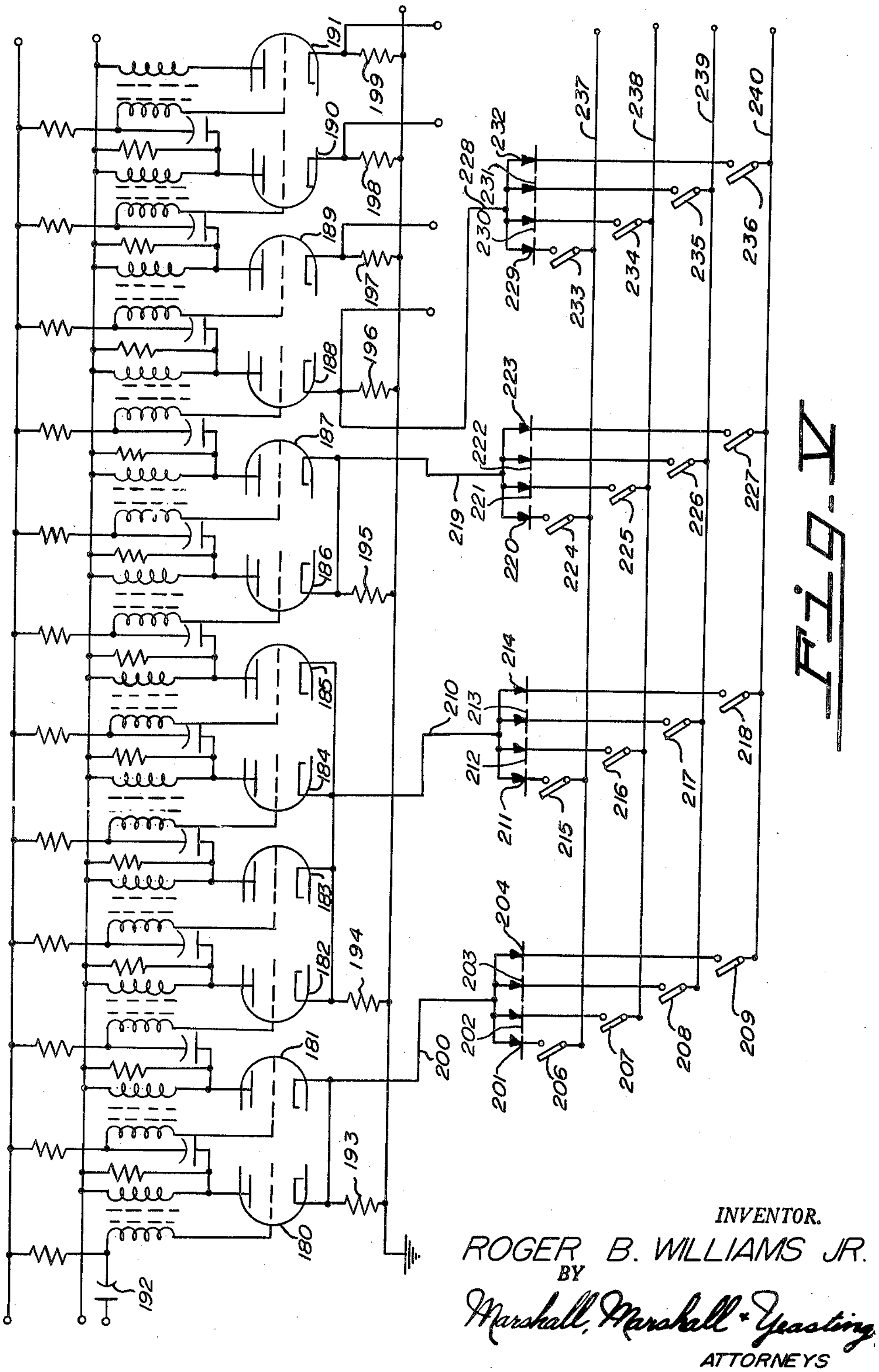
Fig. V
INVENTOR.
ROGER B. WILLIAMS JR.
BY
Marshall, Marshall & Yeasting
ATTORNEYS 2,970,269

Roger B. Williams, Jr., Toledo, Ohio, assignor, by mesne assignments, to Toledo Scale Corporation, Toledo, Ohio, a corporation of Ohio Filed May 18, 1956, Ser. No. 585,787

10 Claims. (Cl. 328—38)

This invention relates to electronic computing equipment and in particular to an improved pulse generator for supplying a predetermined number of pulses for each input pulse, the generated pulses being suitable for use in electronic computing equipment.

In many types of electronic computing equipment pulse generators are required, the pulse generators being of a type that generate a given number of pulses for each input pulse. Usually complicated switching equipment is required to separate the pulses and determine the particular number that are generated or delivered to a particular output line for each input pulse.

The principal object of this invention is to provide an electronically operated pulse generator that delivers a plurality of timed pulses appearing sequentially on each of several signal leads, there being a constant number of pulses per input pulse on each of the leads.

Another object of the invention is to provide a plurality of pulse generators arranged in groups such that each group invariably produces a same number of pulses for each input pulse.

A still further object of the invention is to provide simple switching mechanism for selecting the outputs of the various groups of pulse generators so as to supply predetermined numbers of pulses to an output line or lines.

These and other objects and advantages are obtained in a pulse generator constructed according to the invention.

According to the invention the improved pulse generator system comprises a plurality of individual pulse generators, blocking oscillators or equivalent, arranged to operate sequentially. The oscillators or generators preferably are arranged in groups such that the output from the first group comprises a single pulse, the output from the second group comprises two pulses for each pulse sent through the chain of generators, the output of the third group again comprises two pulses and the output of the fourth group comprises four pulses for each pulse sent through the chain of generators. The numbers 1, 2, 2, and 4 are selected to correspond to the weights ordinarily used in the common binary to decimal conversion code. Switching arrangements are employed to combine the outputs or signals of the four groups in various combinations so as to deliver to an output line or each of several lines zero to nine pulses as may be selected for each line. The switching arrangements may comprise a diode matrix, or individual diodes with relay contacts to combine the outputs signal of the diodes or individual seelctor switches when used with a single output line.

A preferred embodiment of the invention is illustrated in the accompanying drawings.

In the drawings:

Figure I is a schematic block diagram of a computing system employing the improved pulse generator as a portion of the computing circuit.

Figure II is a schematic diagram of an amplifier and pulse shaper suitable for supplying input pulses to the pulse generator.

Figure III is a schematic wiring diagram of a preferred form of the pulse generator and switching system arranged to energize a plurality of ten point selector switches one for each output line.

Figure IV is a schematic wiring diagram of another form of pulse generator in which a series of relays are arranged to select the signals of the various groups of pulse generators and supply an output signal to an output line for utilization purposes.

Figure V is a schematic wiring diagram of another form of pulse generator in which the output circuits are combined by selectively operated switches on the basis of a permutation system.

These specific figures and the accompanying description are intended merely to illustrate the invention and not to impose limitations on its scope.

A computing system embodying a pulse generator constructed according to the invention is illustrated in the block diagram of Figure I. Such a system comprises a source 1 of pulses arranged to deliver a series of pulses equal in number to the magnitude of one of the quantities to enter into a computation. In the system as illustrated the source 1 is preferably a scanner arranged to generate a series of pulses corresponding to the indication of a condition responsive instrument such as a weighing scale. The pulses from the source 1 are transmitted through a lead 2 to an amplifier and shaper circuit 3 where the pulses are shaped to provide rectangulary shaped pulses one for each incoming pulse. These shaped pulses are transmitted over a lead 4 to a pulse generator 5 that is arranged to generate a plurality of pulses for each input pulse on the lead 4.

The pulse generator 5, to be described in detail later, is arranged to deliver two pulses for each input pulse on an output or signal lead 6, four pulses for each input pulse on signal lead 7, two pulses for each input pulse on signal lead 8 and one pulse for each input pulse on signal lead 9. These pulses totaling nine in number are generated sequentially or in time spaced relation, the complete series being generated between the arrival of successive pulses on the input lead 4. In addition to the pulses on the leads 6 to 9 inclusive circuit control pulses are delivered, later in time but as part of the same sequence, to leads 10 and 11 arranged to clear carry circuits included between counter decades in the accumulating apparatus. The last pulse generated in each operation of the pulse generator is applied to an output lead 12 and is transmitted directly to a first counter decade 13 of a multiplicand counter 14. The multiplicand counter as shown comprises four decades, the decade 13 for the units, a decade 15 for the tens, a decade 16 for the hundreds, a decade 17 for the thousands.

The electronic counter 14 indicating or counting the pulses in the multiplicand thus indicates, when the number of pulses represents the position of a condition responsive member, the actual reading of the device.

The various decades 13, 15, 16, and 17 of the multiplicand counter 14 are preferably constructed according to Figure II of Patent No. 2,521,788 issued to Grosdoff on December 12, 1950, and assigned to Radio Corporation of America. The amount indicated in the counter 14 may be mechanically indicated if desired by transmitting the indication by electrical cables 18 to an electromechanical indicating device 19 arranged to position number display wheels 20 according to the count in the electronic counter 14.

At the start of each series of pulses from the pulse source 1 or prior to the start of such series of pulses the electronic counters are reset by a signal voltage transmitted over a lead 21 from the pulse source 1, through a start control 22 and thence over lead 23 arranged to supply a sharp positive pulse to one grid of each stage of the electronic counters thereby conditioning the counters in the state indicating zero or some arbitrarily selected number as a starting point.

The output pulses from the pulse generator 5 delivered over signal leads 6 to 9 inclusive are conducted through a four conductor cable 26 to a switching matrix 27 which is designed and constructed to combine the pulses on the four signal leads and deliver pulses to each of nine leads in a cable 28 connected to a multiplier selector mechanism 29. The selector 29 preferably includes a plurality of selector switches, one for each decade, connected in parallel to the nine leads in the cable 28 with their moving contacts connected to output leads such as leads 30, 31, and 32. The lead 30 corresponds to the units place in the multiplier factor, the lead 31 corresponds to the tens place and the lead 32 corresponds to the hundreds place each lead carrying a number of pulses per input pulse to the generator 5 according to the position of the switch. These places may represent a price in dollars, dimes and cents or they may represent other forms of three place factors. The number of places may be increased merely by employing additional selector switches and additional output leads.

The output leads 30 to 32 from the multiplier selector mechanism are carried through a cable 33 to amplifiers 34, 35, and 36. The amplifier 34, receiving pulses from the lead 30, transmits its output pulses over lead 37 to a first decade 38 of a product counter 39.

The product counter 39, as shown, comprises six decades including the decade 38 for the least value in the product, the decade 40 for the next order, and decades 41, 42, 43, and 44 for the remaining higher orders in the product. The system illustrated, which is designed as a computing scale arranged to provide amount computations according to the weight in pounds and hundreds of pounds of the quantity on the scale and a price in dollars, dimes and pennies set into the multiplier selector 29, provides a computed output in which the decade 38 corresponding to hundredths of cents when each pulse on the lead 4 represents .01 pound. Thus the product of .01 pound times one cent is an amount of .01 of a cent. In this system the counters 41, 42, 43, and 44 represent the amount of the computation in pennies, dimes, dollars and tens of dollars. The output pulses from the multiplier selector delivered on the lead 31, corresponding to the dimes value or the tens place in the multiplier are transmitted through the lead 31 and amplifier 35 and delivered to the second decade 40 of the electronic counter 39. Likewise, the pulses on the output lead 32 of the multiplier selector, corresponding to the dollars factor, are transmitted through the lead 32, and amplifier 36 to the third decade 41 of the amount counter 39 which represents the pennies value in a computed amount since pennies are the result of computation of hundredths of pounds times dollars per pound.

While the pulses delivered by the pulse generator 5 on the signal leads 6, 7, 8, and 9 occur sequentially in time it is nevertheless possible because of the parallel connection of the selector switches for pulses to occur simultaneously on the output lead 30, 31, and 32 and thus be delivered simultaneously to the counter decades 38, 40, and 41. Since a counter is not capable of infinite resolution in distinguishing between pulses it is necessary to prevent any transmission of carry pulses from one counter decade to a second or higher decade when the second decade is receiving pulses directly from the multiplier selector. To prevent interference the carry pulses such as those from the first decade 38 appearing on its output lead 45 are transmitted to and caused to trip a carry storage flip-flop stage 46 rather than being transmitted directly to the next counter decade 40. The carry pulse is thus stored in the flip-flop 46 and is transmitted from the flip-flop to the next amplifier 35 and decade 40 when the flip-flop 46 is reset by a pulse received from the output lead 10 of the pulse generator following the series of pulses delivered on the signal leads 6 to 9 inclusive. In the event that this carry pulse or one of the preceding pulses resulted in a carry output pulse from the decade 40 on its lead 47 a second carry storage occurs in a second flip-flop storage circuit 48. The second carry storage flip-flop 48 is cleared by a second pulse delivered from the pulse generator 5 on lead 11 one unit of time after the pulse on the lead 10 to clear or reset the flip-flop 48 and thereby transmit a pulse to the next amplifier 36 for transmission into the third decade 41 of the counter. Since these pulses for clearing the carry stages occur successively in time and after the pulses transmitted from the multiplier selector there is no danger of simultaneous entry of pulses into any of the amplifiers 35 or 36 or consequently the decades 40 or 41. The remaining decades 42, 43, and 44 receive only carry pulses from the preceding decades and thus are never subject to simultaneous entry of pulses.

The circuit as shown will accommodate a three-digit multiplying factor. Additional places in the multiplier may be accommodated by merely increasing the number of selector switches and the number of amplifiers and carry stages corresponding to the amplifiers 35 and 36.

Since the pulses representing the multiplicand that are generated in the pulse source 1 may not be of suitable wave shape for operation of the pulse generator 5 the amplifier 3 and shaping circuits are included between the leads 2 and 4 of Figure I. A suitable amplifier and pulse shaping circuit for this purpose is illustrated in a schematic diagram in Figure II. As shown in this figure the pulse source 1 is indicated by a scanner and preamplifier 51 that transmits pulse signals over a lead 52, through coupling condenser 53, and grid current limiting resistor 54 to a control grid 55 of a pentode amplifier 56. Grid potential is maintained on the amplifier 56 by grid leak resistor 57 connected between a grounded lead 58 and the junction between the coupling condenser 53 and the current limiting resistor 54. This particular input circuit with the grid current limiting resistor allows high amplitude signals to be transmitted to the amplifier 56 without the amplifier losing control or biasing itself to plate current cutoff.

To provide grid bias the amplifier 56 is provided with a cathode resistor 59 connected between the grounded lead 58 and a cathode 60 of the tube. Likewise the amplifier has a plate 61 which is connected through a plate resistor 62 to a B+ lead 63. The amplifier has its suppressor grid 64 tied directly ot the cathode 60 and the cathode resistor 59 is by-passed with a condenser 65. Likewise a screen grid 66 of the amplifier is connected directly to the B+ lead 63. The amplifier 56 serves as a limiting amplifier in that it can accept input signals over a wide amplitude range without loss of control.

Output signals from the amplifier 56 are transmitted from its plate 61 through coupling condenser 67 connected to the junction between voltage divider resistors 68 and 69 that serve to establish the average grid potential for an input grid 70 of a trigger circuit 71 and thence through a current limiting resistor 72 to the grid 70.

The trigger circuit 71 serves to accept input signals from the amplifier 56 regardless of wave shape and convert the signal into essentially square waves having very short rise and fall times suitable for operating a pulse generator. The trigger circuit 71 comprises a twin triode having cathodes 73 and 74 connected to ground through cathode resistor 75 and having plate resistors 76 and 77 connected respectively to left-hand plate 78 and right-hand plate 79 of the twin triode. The input grid 70 cooperates with the cathode 73 and plate 78 of the left-hand section. The plate 78 is connected to a grid 80 of the right-hand section of the tube through a parallel combination of resistor 81 and condenser 82 while the grid 80 is also connected to ground or the grounded lead 58 through a resistor 83. In this trigger circuit the plate resistor 77 has two-thirds or half of the resistance of the resistor 76 and the circuit normally operates with the left-hand section drawing current so that the plate 78 is at its most negative potential thereby driving the grid 80 sufficiently negative with respect to the cathode 74 to cause plate current cutoff in the right-hand section. When the input grid 70 is driven negative by a pulse signal transmitted from the amplifier 56 plate current is cut off in the left-hand section resulting in a positive going voltage at the plate 78 which is transmitted through the coupling condenser 82 and resistor 81 to the right-hand grid 80 thus permitting the right-hand side of the tube to draw current. This current flow through the right-hand tube is greater than that originally flowing in the left-hand section because of the lesser plate resistance. Thus the cathode potential of the cathodes 73 and 74 becomes more positive when current transfers from the left to the right sections. This increases the effective input signal into the trigger circuit and results in a more rapid switching or triggering action. The output of the trigger circuit is taken from the plate 79 to an output lead 84 and consists, for each input pulse, of a negative pedestal of voltage, i.e. a substantially square wave, comprising a first negative going step of voltage and then finally a positive going step to the initial condition. This negative pedestal of voltage after differentiation in accompanying circuits, not shown in the drawings, results in a sharp negative spike of voltage suitable for triggering electronic counters of the type illustrated in Grosdoff Patent No. 2,521,788 and a sharp positive spike of voltage occurring at the end of the pulse and suitable for triggering the pulse generators illustrated in Figures III, IV, and V.

A suitable pulse generator is shown in Figure III. Such a generator comprises a plurality or chain of blocking oscillators 90 to 98 inclusive plus one or more similar blocking oscillators the output voltages of which are used for control purposes. Each of the blocking oscillators 90 to 98 inclusive includes a pulse transformer 99 having a grid or secondary winding 100 connected to a negative voltage bias lead 101 through a grid biasing resistor 102 and having the other end of its winding connected to a grid 103 of the blocking oscillator 90. The blocking oscillator 90 has a plate 104 that is connected through a plate winding 105 of the transformer 99 to a B+ supply lead 106 maintained at approximately 150 volts positive with respect to a grounded lead 107. The tube also has a cathode 108 that is connected to the grounded lead 107 through a cathode resistor 109 which in some cases may be common to several of the blocking oscillator stages. A damping resistor 110 is connected in parallel with a primary or plate winding 105 of the transformer 99 so as to limit the surge or overshoot of the voltage pulse appearing in the transformer primary upon current cutoff through the plate. The remaining blocking oscillator circuits 91 to 98 inclusive are similar having the same types of circuits and the same values.

Voltage pulses from the trigger circuit 71 are coupled from the output lead 84 through a small coupling condenser 111 to the junction between the grid bias resistor 102 and the secondary winding 100 of the pulse transformer 99. The time constant of the condenser 111 and resistor 102 is in the order of two and one-half microseconds which is quite short compared to the length of the voltage pedestal or pulse on the lead 84. The initial negative going step of voltage at the start of the pulse is without effect on the blocking oscillator chain because it merely drives the grid 103 negative when it is already negative with respect to the cutoff potential of the tube. Thus the negative spike of voltage is ignored by the circuit. The following positive spike of voltage resulting from the differentiation through the short time constant of the condenser 111 and resistor 102 results in a positive voltage applied to the grid 103 sufficient to permit flow of plate current through the plate winding 105 of the transformer. This flow of current through the winding 105 generates the voltage in the secondary winding driving the grid 103 positive thus increasing the flow of plate current. This action is accumulative and the increase in plate current is limited only by the impedance of the tube and its cathode resistor 109. As soon as saturation is reached and there is no further increase in plate current there is no voltage generated in the secondary winding 100 and the grid returns to its normal negative voltage according to the bias voltage on the lead 101. This cuts off the flow of plate current through the tube resulting in a sharp positive voltage pulse at the plate 104. This sharp positive pulse at the plate 104 is transmitted through a second coupling condenser 112 to the secondary winding of the pulse transformer for the next blocking oscillator and thus serves to initiate a cycle of operation of that oscillator at the conclusion of the pulse generated in the first blocking oscillator 90.

The useful output voltage signals from the blocking oscillators are taken from the voltages generated across the cathode resistors, i.e. between ground and the cathodes of the oscillators. In the arrangement shown the first two blocking oscillators 90 and 91 share the cathode resistor 109 so that the output lead 6 carries two output voltage pulses, one from the oscillator 90 and one from the oscillator 91, for each input pulse delivered through the lead 84. Likewise the oscillators 92, 93, 94, and 95 share a cathode resistor 114 and as a result an output lead 7 connected to the cathodes of these oscillators has four pulses impressed thereon for each pulse transmitted through the chain of blocking oscillators. In similar manner the oscillators 96 and 97 share a cathode resistor 116 such that output lead 8 from these oscillators has two pulses per pulse transmitted through the chain. Finally the last oscillator 98 of the chain of nine oscillators has its own cathode resistor 118 so that lead 9 from the cathode of this stage has one pulse per pulse transmitted through the chain.

The cathode of the last oscillator 98 of the series of nine also supplies voltage to the lead 10 that is part of the carry storage circuits of the complete calculating system. An additional blocking oscillator 120 having a cathode resistor 121 supplies a voltage pulse for the carry clear pulse lead 11.

The output pulses on the leads 6, 7, 8, and 9 are combined in a diode switching matrix 27 so as to supply nine output leads or bus bars with pulses in which the number of pulses on each lead corresponds to the number of that lead, i.e. the first lead has one pulse, the second two, the third three, the fourth four, etc. As shown in Figure III the diode matrix 27 is included in the dotted rectangle and comprises a crystal diode 122 that is connected between the lead 6 and a bus bar 123 that is connected to the number eight terminal of each of the selector switches 124, 125, and 126. Thus the number eight terminal receives two pulses from the first two blocking oscillators by way of lead 6 for each input pulse transmitted through the lead 84. Likewise the output lead 7 from the oscillators 92, 93, 94, and 95 is connected directly to a bus lead 127 that is connected to the number four terminal of each of the selector switches to feed four pulses into the number four terminal of each of the selector switches for each incoming pulse. In like manner the lead 8 from the blocking oscillators 96 and 97 feeds two pulses into a bus lead 128 that is connected to the number two terminal of each of the selector switches. Similarly the last blocking oscillator 98 feeds its single output pulse through the lead 9 directly to the bus 129 that is connected to the number one terminal of each of the selector switches. Crystal diodes are employed between the buses or bus leads to combine the pulses from the various leads 6 to 9 inclusive in various combinations for the remaining selector switch terminals. Thus a bus 130 connected to the number three terminals of the selector switches is fed through a diode 131 from the bus 128 which carries two pulses per cycle and is also fed through a diode 132 from the bus 129 that carries one pulse per cycle whereby the bus 130 is provided with three pulses per cycle. In like manner four pulses are transmitted from the bus 127 through diode 133 to bus 134 connected to the number five terminals of the selector switches to provide four pulses, the remaining pulse to make the total of five is fed from the bus 129 through diode 135. Similarly, the bus 136 connected to the number six terminals of each selector switch is supplied with two pulses per cycle through a diode 137 connected to the lead 8 and is provided with four pulses per cycle through a diode 138 thus making a total of six pulses per cycle.

A bus lead 139 connected to the number seven terminal of each of the selector switches is fed with six pulses per cycle through diode 140 and is supplied with one pulse per cycle through diode 141 thus making a total of seven pulses per cycle. The number eight bus that is the bus 123 is supplied with six pulses per cycle through diode 142 connected to the bus 136 and as mentioned before is supplied with two pulses per cycle through the diode 122 thus making the total of eight. Finally, number nine bus 143 connected to the number nine terminals of each selector switch is fed with eight pulses per cycle through diode 144 and is supplied with one additional pulse per cycle through diode 145 thus making a total of nine pulses per cycle or per pulse transmitted through the blocking oscillator chain.

This combination of diodes is one of a number of such combinations that may be used to combine the serially generated pulses appearing on the leads 6, 7, 8, and 9 into series of pulses appearing at the selector switches 30, 31, and 32 wherein each terminal of a selector switch is provided with a number of pulses corresponding to its particular value in the series of terminals. The pulses transmitted through the selector switches are, according to Figure I, transmitted directly to the amplifiers that feed various decades of the product or amount counter. It may be noted that either the bus bars connected to the number nine terminals of the selector switches or the common arms of the selector switches must be conductively connected to ground through a load resistor to avoid accumulating positive voltage on the bus bars because of the rectifying action of the diodes.

This circuit with a minimum number of components thus provides for the reliable generation of series of pulses of precisely predetermined numbers selectable at will by selector switches so that the output of the selector switches may be accumulated in an electronic counter to indicate the product of the number of pulses supplied over the lead 84 times the multiplying factor set up in the selector switches 30, 31 and 32.

The circuit in Figure III for combining the output pulses on the signal leads of the pulse generator may be employed to feed as many selector switches as may be desired. Occasionally it is only necessary to feed pulses into one stage of an electronic counter. In this case a comparatively simple switching arrangement may be employed as illustrated in Figure IV. As shown in this figure a blocking oscillator chain comprising oscillators 151, 152, 153, etc. up to and including 159, are connected in circuit identical with the blocking oscillators illustrated in Figure III. As before the cathodes of the oscillators 151 and 152 are tied together and are connected through a lead 161 to a first single pole, double throw contact arrangement 162. Likewise, a signal lead 163 that is connected to the cathodes of the oscillators 153 to 156 inclusive is connected to the common terminal of a single pole, double throw selector switch 164. In like manner the oscillators 157 and 158 are connected through signal lead 165 to a third single pole, double throw switch 166. Also the output signal lead 167 of the oscillator 159 is connected to a fourth single pole, double throw switch 168. When the switches 162, 164, 166 and 168 are thrown to the lower position, opposite to that shown in the drawing, the blocking oscillators are connected to an output lead 169 that is connected to ground through a cathode resistor 170. The output lead 169 may be connected either directly or through an amplifier to an electronic counter to count the number of selected pulses resulting from input pulses applied to the input of the blocking oscillator chain. If the switches are left in their unactuated position, as shown in the drawing, the corresponding blocking oscillators are connected to a cathode lead 171 that is connected to ground through a resistor 172. The resistors 170 and 172 are equal in magnitude and each is equal to any of the resistors 109, 114, 116 or 118 of the oscillators shown in Figure III. Ordinarily these resistors are of the order of 500 ohms each.

The switches 162, 164, 166 and 168 may be either manually operated or they may be operated by relay coils 173, 174, 175 or 176. The relays may, for example, be operated through suitable amplifying devices from an electronic counter that measures some given condition and is to set up a multiplying factor accordingly. Thus, for example, if the counter is of the ordinary binary-decade type, a counter in which certain feedback connections are applied so that the count represented by the various stages is in the order of 1, 2, 2 and 4, may be connected directly to the relays to operate the relay 176 in accordance with the count indicated by the unit or first stage of the electronic counter, the relays 173 and 175 in accordance with the second and third stages of the counter and the relay 174 in accordance with the fourth stage of the counter. If other values are desired they may be accommodated by merely changing the number of blocking oscillators included on each of the single pole, double throw switches.

It occasionally becomes necessary in using multiplier pulse generators to supply a number of output leads leading to various decades of the product counters with pulses that are selected by operation of relays rather than multipoint selector switches as was illustrated in Figure III. Figure V illustrates a switching circuit in combination with a pulse generator arranged so that the operation of switches in various combinations, which switches may be operated by relay coils or manually, are used to determine the number of pulses delivered to each of several output leads for each input pulse to the multiplier. As shown in Figure V a blocking oscillator chain is employed for generating the plurality of pulses for each input pulse. These oscillators 180 to 191 inclusive comprise 9 oscillators numbered 180 to 188 inclusive that are combined into groups for feeding pulses into the various combinations of switches and three additional oscillators, 189, 190 and 191 which together with the ninth oscillator 188 deliver the pulses to clear the carry stages that must be employed between the various stages of the electronic counter used to totalize the count.

The circuits for the blocking oscillators 180 to 191 inclusive are similar to the oscillator 90 illustrated in Figure III. Similarly, input pulses applied through an input condenser 192 are transmitted through the chain of oscillators from one to the next, each one going through its cycle of oscillation before passing the pulse to the next oscillator. As the pulse thus travels through the chain and each oscillator executes its cycle of oscillation, corresponding voltage pulses appear across the cathode resistor 193 of the oscillators 180 and 181; resistor 194 of oscillators 182 to 185 inclusive; resistor 195 of oscillators 186 and 187; and resistor 196 of oscillator 188. Corresponding pulses appear for carry storage resetting purposes across cathode resistors 197, 198 and 199. Voltage pulses from the first two oscillators are taken through a signal lead 200 and a plurality of crystal diodes 201 to 204 inclusive to feed switch points of a series of switches 206 to 209 inclusive.

In like manner output voltage signals from the group of oscillators 182 to 185 are taken through signal lead 210, crystal diodes 211 to 214 inclusive, to switches 215 to 218 inclusive. Likewise output pulses from the third group of oscillators, the oscillators 186 and 187, are taken through a signal lead 219 and crystal diodes 220 to 223 inclusive to feed switches 224 to 227 inclusive. In similar manner the output voltage pulses of the oscillator 188 are taken through a signal lead 228 and crystal diodes 229 to 232 inclusive to feed switches 233 to 236 inclusive. The switches are connected to output leads 237, 238, 239, and 240 which may be connected to feed pulses into corresponding decades of an electronic counter. Thus the leads 237, 238, 239 and 240 correspond in function to the leads 30, 31 and 32 shown in Figure I as transmitting pulses from a selector device to the amplifiers which feed the first few decades of the electronic counter.

In this arrangement the switches 206, 215, 224, and 233 are connected to the output lead 237 and may be closed in various combinations to provide from zero to nine impulses suitable for a first stage of an electronic counter. Likewise switches 207, 216, 225, and 234 are connected to the output lead 238 so as to provide by selective combinational operation from zero to nine pulses per input pulse for the lead 238. Similar connections are provided for the remaining switches to feed the output leads 239 and 240. This combination serves the same purpose for a multi-denomination multiplier factor as did the simple switching illustrated in Figure IV serve for connecting the pulse generator to a single decade of an electronic counter. When going to multiple decades as shown in Figure V it is necessary to isolate the various signal leads 200, 210, 219, and 228 by way of the crystal diodes 201 to 204, 211 to 214, 220 to 223, and 229 to 232 so as to avoid the interconnecting of one output lead to another. For example, if the diode rectifiers were not included and two switches leading from one of the signal leads were closed the two corresponding output leads would be connected together for all pulses and all the pulses appearing on one lead would also appear on the other. This would prevent the selective transmission of pulses to the various decades of the electronic counter.

The four switches shown connected to each of the output leads, as will be noted, are connected to combination groups of blocking oscillators such that one of the switches when closed will transmit a single pulse for each input pulse through the oscillator chain, a second of the switches will transmit two pulses per pulse, a third will transmit two, and a fourth will transmit four pulses. Thus by selective combination according to one of the well known binary-decimal codes any decimal number of pulses may be obtained according to the corresponding binary actuation of the switches. Thus it is possible to directly connect relay coils, to operate the various switches, to corresponding decades of an auxiliary electronic counter employed to set up a multiplier factor according to the count accumulated in the auxiliary counter. This type of operation is of value in certain computing systems and in solving certain types of problems. It also makes it possible to set the multiplier device to a particular multiplier factor by remote control using a minimum number of leads, that is four leads per decade.

This particular type of pulse generator and switching circuits as illustrated in the various figures provides simple, reliable means for generating series of pulses according to input pulses in which the number may be easily selected and in which the pulses are of equal amplitude and readily identifiable by the counting equipment.

Various modifications of the switching circuits and in number of oscillators per group may be made without losing the advantages of combining the output of various groups of pulse generators wherein each group invariably produces the same number of pulses per input pulse for all cycles of operation.

Having described the invention, I claim:

1. In a pulse generator system, in combination, a plurality of single cycle oscillators serving as pulse generators arranged to operate in sequence, said oscillators being arranged in groups, there being at least one group having a single oscillator and at least two groups having at least two oscillators per group, a single lead from each group, a plurality of output leads, and unilateral conductive means connecting the signal leads to the output leads, each signal lead being connected to at least two output leads in combinations such that each output lead is connected to a different number of oscillators.

2. In a single cycle oscillators serving as pulse generator system, in combination a plurality of pulse generators arranged to operate in sequence in response to an input pulse; said oscillators being divided into groups; a signal lead from each group wherein a first lead has one pulse per input pulse, a second and a third lead each have two pulses per input pulse, and a fourth lead has four pulses per input pulse; an output lead, and switching means connecting the signal leads to the output lead in selectable combinations including no connection, whereby the output lead may have from zero to nine pulses per input pulse.

3. In a pulse generator system, in combination, a plurality of single cycle oscillators serving as pulse generators arranged to operate in sequence in response to an input pulse; said oscillators being divided into groups; a signal lead from each group wherein a first lead has one pulse per input pulse, a second and a third lead each have two pulses per input pulse, and a fourth lead has four pulses per input pulse; a plurality of output leads, and switching means including unilateral conducting means connecting the signal leads to the output leads in selectable combinations including no connection, whereby each output lead may have from zero to nine pulses per input pulse.

4. A pulse generator system according to claim 3 having at least one selector switch connected to the output leads.

5. In a pulse generator system, in combination, a plurality of single cycle oscillators serving as pulse generators arranged in series and each except the last being arranged to start the next oscillator as it completes its cycle of oscillation, means arranged to apply starting pulses to the first oscillator, said series of oscillators being divided into groups some of which include a different number of oscillators than others, a signal lead from each group, an output lead, and switching means interconnecting selected ones of the signal leads and the output lead.

6. A pulse generator system according to claim 5 in which a first group of oscillators is limited to one oscillator, two groups have two oscillators each, and a fourth group has four oscillators.

7. A pulse generator system according to claim 5 in which unilateral switching means are included in the connection between the signal and output leads.

8. In a pulse generator system, in combination, a plurality of single cycle oscillators serving as pulse generators arranged in series and each except the last being arranged to start the next oscillator as it completes its cycle of oscillation, means arranged to apply starting pulses to the first oscillator, said series of oscillators being divided into groups some of which include a different number of oscillators than at least one other group, a common signal lead from each group, a plurality of output leads and switching means for selectively connecting from none to all of said signal leads to each of said output leads.

9. A pulse generator according to claim 8 in which the switching means includes unilateral conducting elements.

10. A pulse generator according to claim 8 having an output lead for each digit in the decimal system, and unilateral conducting elements connecting each output lead through the signal leads to a number of oscillators equal to the digit corresponding to the particular output lead.

References Cited in the file of this patent

UNITED STATES PATENTS 2,519,184 Grosdoff ---------- Aug. 15, 1950

2,563,841 Jensen ---------- Aug. 14, 1951
2,570,716 Rochester ---------- Oct. 9, 1951
2,606,288 Chatterton et al. ---------- Aug. 5, 1952
2,617,873 Lovell et al. ---------- Nov. 11, 1952
2,627,033 Jensen et al. ---------- Jan. 27, 1953
2,639,378 Moerman ---------- May 19, 1953
2,693,593 Crosman ---------- Nov. 2, 1954
2,697,549 Hobbs ---------- Dec. 21, 1954
2,778,878 Malthaner et al. ---------- Apr. 26, 1957

UNITED STATES PATENT OFFICE
CERTIFICATE OF CORRECTION

Patent No. 2,970,269 January 31, 1961

Roger B. Williams, Jr.

It is hereby certified that error appears in the above numbered patent requiring correction and that the said Letters Patent should read as corrected below.

Column 10, lines 16 and 17, for "In a single cycle oscillators serving as pulse generator system, in combination a plurality of pulse generators" read -- In a pulse generator system, in combination a plurality of single cycle oscillators serving as pulse generators --.

Signed and sealed this 27th day of February 1962.

(SEAL)
Attest:

ERNEST W. SWIDER
Attesting Officer

DAVID L. LADD
Commissioner of Patents